C. W. GERDES.
DISK CULTIVATOR AND HARROW.
APPLICATION FILED SEPT. 9, 1910.
982,051.
Patented Jan. 17, 1911.
2 SHEETS—SHEET 1.
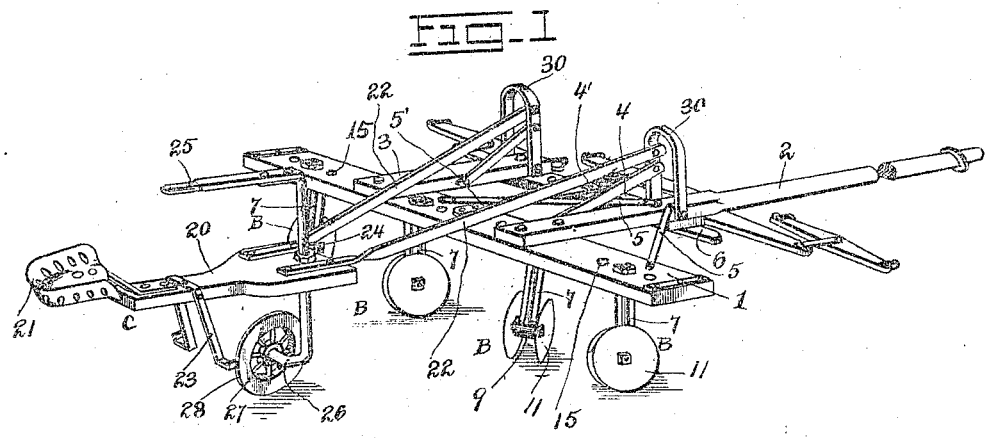
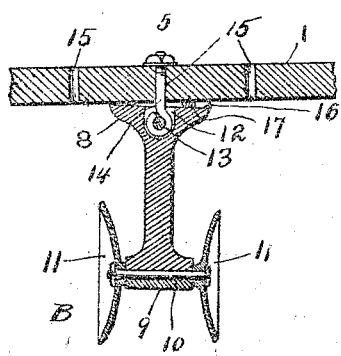
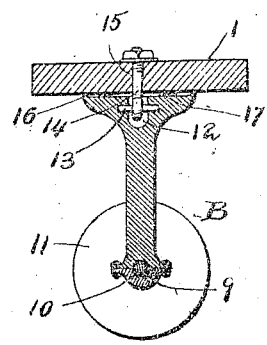
Witnesses
Thos. G. Knox,
Wm. Bagger
Inventor
Charles W. Gerdes
By Victor J. Evans
Attorney

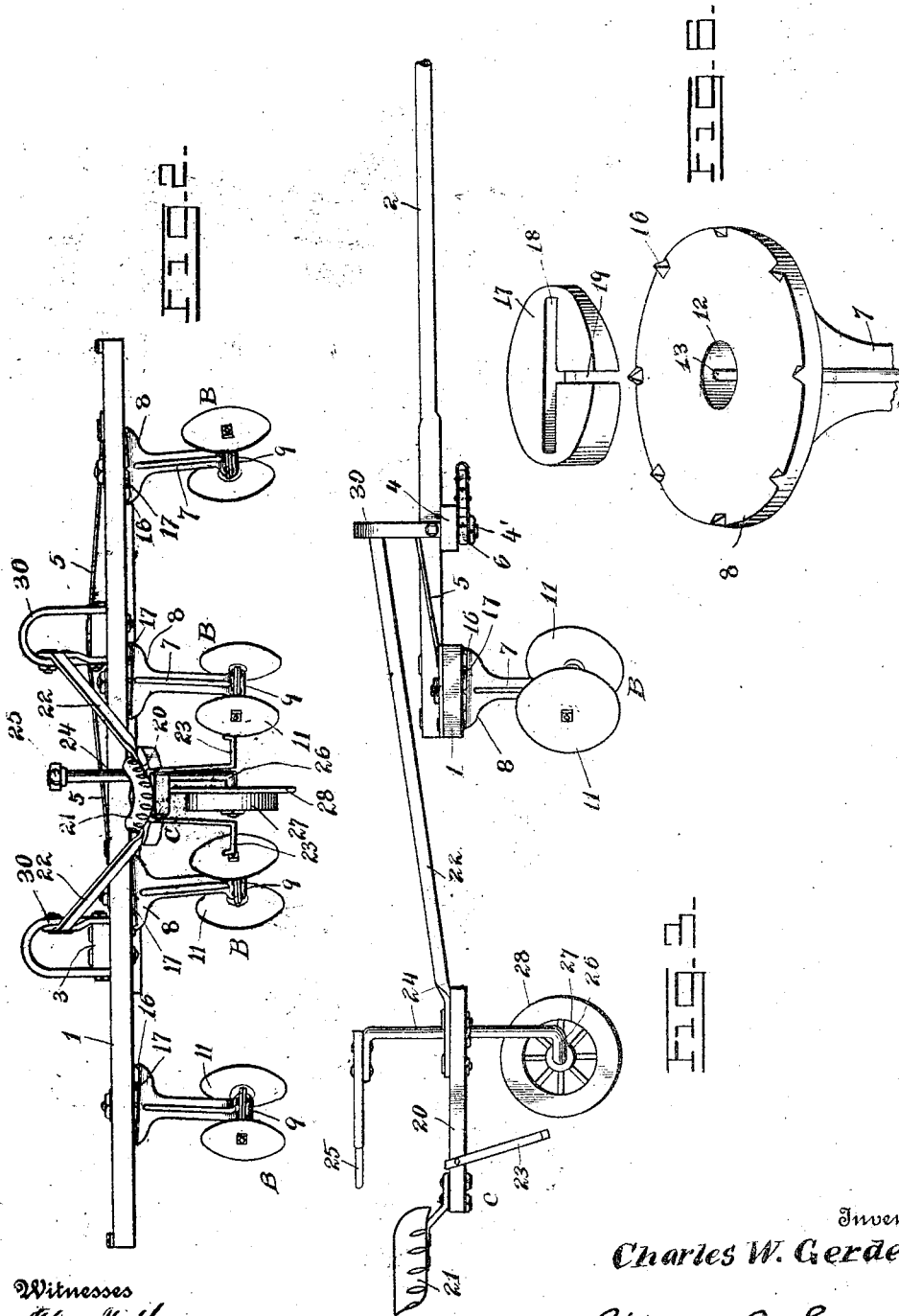

UNITED STATES PATENT OFFICE.

CHARLES W. GERDES, OF MOUND VALLEY, KANSAS.

DISK CULTIVATOR AND HARROW.

982,051.

Specification of Letters Patent. Patented Jan. 17, 1911.

Application filed September 9, 1910. Serial No. 581,127.

*To all whom it may concern:*

Be it known that I, CHARLES W. GERDES, a citizen of the United States of America, residing at Mound Valley, in the county of Labette and State of Kansas, have invented new and useful Improvements in Disk Cultivators and Harrows, of which the following is a specification.

This invention relates to disk cultivators, and it has for its object to produce an implement of this class which shall be capable of cultivating two or more rows of plants at each passage and which shall be simple in construction and efficient in operation.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a perspective view of a disk cultivator constructed in accordance with the invention. Fig. 2 is a rear elevation of the same. Fig. 3 is a side elevation. Fig. 4 is a sectional detail view taken vertically through one of the disk carrying standards and the disks connected therewith. Fig. 5 is a vertical sectional view taken on the line 5—5 in Fig. 4. Fig. 6 is a perspective detail view showing the upper end of one of the standards and the adjusting washer detached.

Corresponding parts in the several figures are denoted by like characters of reference.

The frame of the machine composed of a plank 1 of suitable dimensions having a forwardly extending tongue 2 and a forwardly extending bracket 3 which is connected with the tongue by means of a cross bar 4, suitable braces being provided to reinforce the construction, as shown at 5. An evener 6 has been shown pivotally connected with the frame bar 4 upon which it is adjustable by means of a pin or hammer bolt 4' which is connected with the main frame bar by a brace member 5'. The evener is to be equipped with draft attachments of any suitable construction. Under the arrangement shown in the drawing a three-horse equalizer is illustrated, but it is obvious that this arrangement is subject to modification according to the size of the machine and the number of draft animals that are employed.

Secured upon the underside of the beam or plank 1 are a plurality of pairs of standards B each comprising a shank 7 of cruciform cross section, said shank having at its upper end a head 8 and at its lower end a boxing 9 wherein a shaft 10 is supported for rotation, said shaft carrying at its ends the cultivating disks 11 which are of ordinary well known construction and of any suitable dimensions. The head 8 at the upper end of each shank is provided with a recess 12 having a cross bar 13 which is engaged by an eye bolt 14 extending upwardly through one of a plurality of perforations 15 in the plank or beam 1, said eye bolt being provided with a nut 15' which may be tightened for the purpose of securing the standard firmly in position. The head of the standard is provided with upwardly extending teeth or spurs 16 adapted to bite into the underside of the plank or beam 1 for the purpose of establishing a firm connection between said plank and the standard. Fitted upon the eye bolt 14 is a wedge-shaped washer 17 having a bolt engaging slot 18 enabling the said washer to be adjusted laterally, thereby tilting the standard to any desired extent with reference to the beam or plank, it being obvious that the direction of the tilt may be changed by changing or reversing the position of the washer. It is also obvious that by removing the washer, the standard may be secured in a position practically at right angles to the beam or plank 1.

It is evident that when the standard is tilted, the cultivator disks carried by such standard will be correspondingly tilted. It is further evident that by turning or adjusting the standard about its axis each one of the disks carried by such standard may be set in advance of the other disk. Two disks carrying standards being employed for each row, it is further evident that the standards may be adjusted so that the dirt will be moved either toward or away from the plants, as may be desired, and also that by properly tilting the standards, the device may be fitted to operate upon a ridge when so desired, the soil being moved in either direction toward or from the plants growing at the crest of such ridge. The various adjustments may be very readily effected by simply loosening the nut 15' upon the bolt 14. To enable the washer 17 to be removed from the bolt without disassembling the parts said washer is preferably provided with a notch 19 extending from the slot 18 to the edge of the washer, said notch being disposed intermediate the ends of the slot.

C designates a seat carrying truck consisting of a center bar 20 carrying a seat 21 and having obliquely disposed forwardly extending divergent side bars 22, the forward ends of which are hingedly connected with yokes 30 rising from the tongue 2 and the bracket 3, respectively. The frame bar C is provided with a foot rest 23 in front of the seat. Suitably connected with the truck bar 20 and supported for rotation is a vertical shaft 24 having at its upper end an operating arm or lever 25 and at its lower end a rearwardly extending arm 26 carrying a caster wheel 27 which trails in rear of the disk carrying standards and which serves to guide the machine, said trailing wheel being provided with an earth-engaging flange 28 for the purpose of preventing side motion. It will be noticed that the weight of the operator is imposed upon the truck bar 20, some distance in rear of the supporting wheel, and the forwardly extending arms 22 which are hingedly connected with the yokes 30 will thus exert an upward lift upon the tongue, thus relieving the necks of the draft animals of the weight which would otherwise be imposed thereupon, and, accordingly, facilitating the operation of the device to a large extent.

The operation and advantages of this invention will be readily understood from the foregoing description, taken in connection with the drawings hereto annexed.

It is obvious that the device may be made of any desired dimensions to operate upon two or more rows of plants and that any desired number of draft animals may be utilized to draw the machine over the field. To operate upon each row of plants two disk carrying standards are provided, each of said standards having a pair of disks, which by proper adjustment of the standards in the manner hereinafter described, may be arranged to operate in the most advantageous manner with reference to the plants growing either upon level soil or at the crest of a ridge. The desired adjustment may be made very easily and quickly by simply loosening the nuts 15 and adjusting the standards and the washers 17 to the desired position to which the nuts are again tightened, the standards being retained with absolute security by one or more of the teeth or spurs 16 biting into the underside of the beam 1. The wedge-shaped washers 17 may be readily removed when it shall be desired to arrange the standards approximately at right angles with reference to the supporting beam 1.

It is evident that the improved device, while mainly described as a cultivator, may be utilized as a harrow by properly adjusting the earth-engaging disks, or that an implement specially designed for harrowing the ground may be constructed on the lines of the implement herein described.

Having thus described the invention, what is claimed as new, is:—

1. In an implement of the character described, a beam having apertures, a disk carrying standard having upwardly extending spurs and provided with an eye bolt flexibly connected therewith and extending through an aperture of the beam, a slotted wedge-shaped washer upon the eye bolt, and a tightening nut upon said bolt.

2. In an implement of the character described, a beam having apertures, a disk carrying standard having upwardly extending spurs, an eye bolt flexibly connected with the standard and extending through an aperture of the beam, a wedge-shaped washer having a slot engaging the eye bolt between the beam and the standard and provided with a notch extending from the slot through the edge of the washer, and a tightening nut upon the bolt.

3. In an implement of the character described, a beam having apertures, a disk carrying standard having a bolt flexibly connected therewith and extending through one of the apertures, a tightening nut upon the bolt and a wedge-shaped washer engaging the bolt between the standard and the beam and having a bolt engaging slot and a notch extending from the slot intermediate the ends thereof through the edge of the washer.

4. In a device of the character described, a beam, a disk carrying standard connected with the beam hingedly and for adjustment about its axis, and a longitudinally slidable wedge member interposed between the beam and the standard, whereby the latter may be tilted to various degrees and in various directions.

5. In a device of the character described, a beam, a disk carrying standard connected with the beam hingedly and for adjustment about its axis, and a longitudinally slidable wedge member adjustably and detachably interposed between the beam and the standard, whereby the latter may be tilted to various degrees and in various directions.

In testimony whereof I affix my signature in presence of two witnesses.

CHARLES W. GERDES.

Witnesses:
 FRED C. REEVES,
 JAMES A. WISE.